(12) United States Patent
Meng et al.

(10) Patent No.: US 11,256,010 B2
(45) Date of Patent: Feb. 22, 2022

(54) AREA LIGHT SOURCE AND DISPLAY DEVICE

(71) Applicant: BOE Technology Group Co., Ltd., Beijing (CN)

(72) Inventors: Xiandong Meng, Beijing (CN); Wei Wang, Beijing (CN); Xue Dong, Beijing (CN); Jing Lv, Beijing (CN); Xiaochuan Chen, Beijing (CN); Jifeng Tan, Beijing (CN); Jian Gao, Beijing (CN); Xianqin Meng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 426 days.

(21) Appl. No.: 16/329,456

(22) PCT Filed: Jun. 11, 2018

(86) PCT No.: PCT/CN2018/090697
§ 371 (c)(1),
(2) Date: Feb. 28, 2019

(87) PCT Pub. No.: WO2019/024605
PCT Pub. Date: Feb. 7, 2019

(65) Prior Publication Data
US 2020/0166680 A1    May 28, 2020

(30) Foreign Application Priority Data
Aug. 1, 2017  (CN) .......................... 201710647865.0

(51) Int. Cl.
*G02B 5/18* (2006.01)
*G02F 1/13357* (2006.01)

(52) U.S. Cl.
CPC ..... *G02B 5/1814* (2013.01); *G02F 1/133605* (2013.01); *G02F 2201/06* (2013.01); *G02F 2203/22* (2013.01)

(58) Field of Classification Search
CPC ............. G02B 5/1814; G02F 1/133605; G02F 2201/06; G02F 2203/22
(Continued)

(56) References Cited

U.S. PATENT DOCUMENTS 5,561,558 A    10/1996  Shiono et al.
2005/0185915 A1  8/2005  Yu et al.
(Continued)

FOREIGN PATENT DOCUMENTS

CN    1116719 A    2/1996
CN    1580901 A    2/2005
(Continued)

OTHER PUBLICATIONS

Office Action for corresponding Chinese Application 201710647865.0 dated Feb. 27, 2019.
International Search Report for PCT/CN2018/090697 dated Sep. 25, 2018.

*Primary Examiner* — Charles S Chang
(74) *Attorney, Agent, or Firm* — Arent Fox LLP; Michael Fainberg

(57) ABSTRACT

A surface light source, comprising a waveguide layer and a grating structure; the waveguide layer has a first surface and a second surface opposite to each other; the grating structure is provided on the first or second surface of the waveguide layer; and the grating structure is used for guiding light incident to the grating structure to the waveguide layer and performing total reflection propagation in the waveguide layer. Such surface light source structure enables energy and direction of light emitted from a light field modulation layer to be distributed uniformly, and thus the thickness of the
(Continued)

surface light source and the number of LEDs in the surface light source are reduced. Also disclosed is a display device.

17 Claims, 9 Drawing Sheets

(58) Field of Classification Search
USPC .................................................... 349/62–64
See application file for complete search history.

(56) References Cited

U.S. PATENT DOCUMENTS

| | | |
|---|---|---|
| 2007/0097709 A1 | 5/2007 | Hsieh |
| 2007/0139960 A1 | 6/2007 | Tsai |
| 2010/0165247 A1* | 7/2010 | Jeong ................ G02F 1/133606 349/64 |
| 2013/0100695 A1 | 4/2013 | Yankov et al. |
| 2015/0219936 A1* | 8/2015 | Kim .................. G02F 1/133602 362/97.1 |
| 2018/0067251 A1* | 3/2018 | Baldwin .............. G02B 6/0068 |

FOREIGN PATENT DOCUMENTS

| | | |
|---|---|---|
| CN | 1627151 A | 6/2005 |
| CN | 1658036 A | 8/2005 |
| CN | 1959490 A | 5/2007 |
| CN | 1982974 A | 6/2007 |
| CN | 105549150 A | 5/2016 |
| CN | 106526738 A | 3/2017 |
| CN | 107193070 A | 9/2017 |
| JP | H06224851 A | 8/1994 |
| KR | 20080028133 A | 3/2008 |

* cited by examiner

Determine a size of a light field, on a lower surface of the waveguide layer, of a light source  — S101

Sample and divide the lower surface L of the waveguide layer into several blocks P at a uniform interval so that the light coupling efficiency of the light rays of the light source through each block P satisfies a preset condition  — S102

| | Angle (°) | Efficiency (%) |
|---|---|---|
| I | 0 | 100 |
| T-2 | -45.181 | 42.452 |
| T-1 | -20.773 | 1.872 |
| T0 | 0 | 5.5175 |
| T+1 | 20.773 | 1.6719 |
| T+2 | 45.181 | 41.643 |
| R-1 | 32.131 | 2.2644 |
| R0 | 0 | 2.3071 |
| R+1 | -32.131 | 2.2722 |

| | Angle (°) | Efficiency (%) |
|---|---|---|
| I | 5.7 | 100 |
| T-2 | -46.213 | 39.081 |
| T-1 | -19.138 | 8.6641 |
| T0 | 3.7976 | 11.758 |
| T+1 | 27.407 | 1.4416 |
| T+2 | 58.691 | 30.931 |
| R-1 | 29.448 | 0.21166 |
| R0 | -5.7 | 3.6192 |
| R+1 | -43.651 | 4.2931 |

| | Angle (°) | Efficiency (%) |
|---|---|---|
| I | 35 | 100 |
| T-4 | -65.122 | 8.1945 |
| T-3 | -35.788 | 10.019 |
| T-2 | -15.21 | 2.4064 |
| T-1 | -3.4435 | 11.094 |
| T0 | 22.488 | 9.4519 |
| T+1 | 44.823 | 53.532 |
| R-3 | 61.275 | 0.6364 |
| R-2 | 23.168 | 0.021867 |
| R-1 | -5.1678 | 1.4037 |
| R0 | -35 | 3.0436 |

| | Angle (°) | Efficiency (%) |
|---|---|---|
| I | 61 | 100 |
| T-4 | -44.947 | 61.719 |
| T-3 | -22.584 | 4.3411 |
| T-2 | -3.5322 | 1.1973 |
| T-1 | 15.118 | 5.8906 |
| T0 | 35.679 | 1.3014 |
| T+1 | 64.931 | 23.999 |
| R-3 | 35.162 | 0.74589 |
| R-2 | 5.301 | 0.50139 |
| R-1 | -23.024 | 0.29231 |
| R0 | -61 | 0.012394 |

Fig. 19

AREA LIGHT SOURCE AND DISPLAY DEVICE

CROSS-REFERENCE TO RELATED APPLICATION

This application is a National Stage of International Application No. PCT/CN2018/090697, filed Jun. 11, 2018, which claims priority to Chinese Patent Application No. 201710647865.0, filed Aug. 1, 2017, both of which are hereby incorporated by reference in their entireties.

FIELD

This disclosure relates to the field of display technologies, and particularly to an area light source and a display device.

BACKGROUND

A Liquid Crystal Display (LCD) as a light-transmitting display needs a backlight component to provide a required brightness when it displays an image. Where a Light-Emitting Diode (LED) light source, which is the most common light source in a direct-type backlight structure of LCD, is characterized in a long service lifetime, a small volume, low voltage, etc., but since the LED light source is a point light source, the uniformity of light emitted from the LED light source is difficult to control.

SUMMARY

Embodiments of the disclosure provide an area light source including: a waveguide layer, where the waveguide layer includes a first surface and a second surface opposite thereto, and the second surface of the waveguide layer includes a light extraction component configured to guide light rays propagated in a total reflection mode in the waveguide layer to an outside uniformly; a plurality of light sources, where each of the plurality of light sources is located on a side of the first surface; and a plurality of two-dimensional diffraction grating components, where the plurality of two-dimensional diffraction grating components correspond to the plurality of light sources in a one-to-one manner, each of the plurality of two-dimensional diffraction grating components is located between a corresponding light source and the light extraction component, and each of the plurality of two-dimensional diffraction grating components comes into contact with the waveguide layer, and is configured to guide light rays emitted from the corresponding light source into the waveguide layer.

Optionally, an orthographic projection of each of the plurality of light sources onto the waveguide layer is located at a center of an orthographic projection of a corresponding two-dimensional diffraction grating component onto the waveguide layer.

Optionally, each of the plurality of two-dimensional diffraction grating components satisfies a following condition:

$$D = \frac{2d}{\tan 30°};$$

where D is a diameter of the two-dimensional diffraction grating component, and d is a distance between a corresponding light source, and a surface of the waveguide layer proximate to the two-dimensional diffraction grating component.

Optionally, the waveguide layer satisfies a condition of $$\frac{4h}{\tan \theta} > D,$$

where h is a thickness of the waveguide layer, θ is an incidence angle of a light ray incident on the waveguide layer, and D is a diameter of each of the plurality of two-dimensional diffraction grating components.

Optionally, the thickness of the waveguide layer is greater than or equal to two micrometers.

Optionally, the light extraction component includes one or more of a plurality of netted dot components, or a plurality of grating components.

Optionally, a refractive index of each of the plurality of two-dimensional diffraction grating components is higher than a refractive index of the waveguide layer.

Optionally, each of the plurality of two-dimensional diffraction grating components includes a first sub-grating, and a plurality of second sub-gratings surrounding the first sub-grating; an orthographic projection of the first sub-grating onto the waveguide layer is a circle, and orthographic projections of the plurality of second sub-gratings onto the waveguide layer are rings concentric with the circle and with different radiuses.

Optionally, a periodicity, a line width, and a height of the first sub-grating are not exactly the same as a periodicity, a line width, and a height of at least one of the plurality of second sub-gratings, and periodicities, line widths, and heights of at least two of the plurality of second sub-gratings are not exactly the same from each other.

Optionally, the first sub-grating includes a plurality of first sub-components in any one periodicity of the first sub-grating; and both line widths and heights of respective first sub-components are not equal; or line widths of respective first sub-components are equal, but heights of the respective first sub-components are not equal; or line widths of respective first sub-components are not equal, but heights of the respective first sub-components are equal.

Optionally, each of the plurality of second sub-gratings includes a plurality of second sub-components in any one periodicity of the second sub-grating; and both line widths and heights of respective second sub-components are not equal; or line widths of respective second sub-components are equal, but heights of the respective second sub-components are not equal; or line widths of respective second sub-components are not equal, but heights of the respective second sub-components are equal.

Optionally, each of the plurality of two-dimensional diffraction grating components comes into contact with the first surface, and a preset distance exists between each of the plurality of light sources and the first surface.

Optionally, each of the plurality of two-dimensional diffraction grating components comes into contact with the second surface, and an orthographic projection of the light extraction component onto the waveguide layer does not overlap with an orthographic projection of each of the plurality of two-dimensional diffraction grating components onto the waveguide layer.

Optionally, each of the plurality of light sources comes into contact with the first surface.

Optionally, each of the plurality of light sources is a monochromatic light source; the area light source further includes a monochromatic light conversion layer located on a light-emitting side of the area light source; and the monochromatic light conversion layer is configured to convert monochromatic light emitted from each of the plurality of light sources into white light.

Optionally, the monochromatic light conversion layer includes one or more of a fluorescent layer or a quantum dot layer.

Optionally, the area light source further includes a reflection layer located on a side of the waveguide layer away from the monochromatic light conversion layer.

Embodiments of the disclosure further provide a display device including the area light source according to the embodiments of the disclosure.

BRIEF DESCRIPTION OF THE DRAWINGS

FIG. 19 is a graph of a part of optimization results of light coupling efficiencies of respective sub-gratings in a two-dimensional diffraction grating component according to some embodiments of the disclosure.

DETAILED DESCRIPTION OF THE EMBODIMENTS

Figure 1:
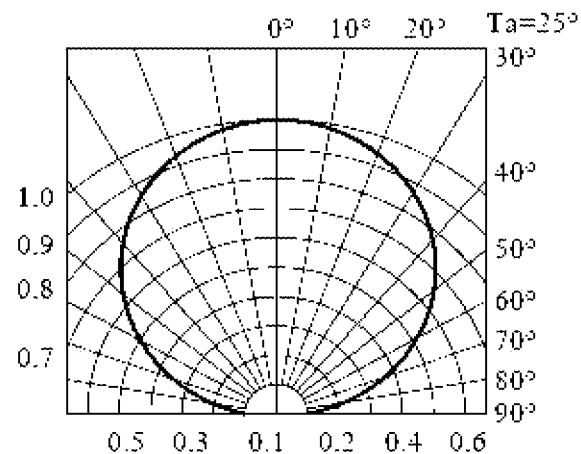
FIG. 1 is a diagram of a light field distribution, which appears as a Lambert curve, of a single LED light source.

Since light field distributions of individual LED light sources are presented as Lambert curves and are substantially the same, their energies are generally concentrated between −60°~60° with a highest energy at 0° as illustrated in FIG. 1. Hot spots may occur due to this characteristic of the LED light sources, that is, a distinct bright and dark phenomenon will occur in an image displayed using point LEDs as light sources, thus degrading the effect of displaying the image.

At present, in order to improve the display effect of an LCD, to avoid hot spots from occurring, and to improve the comfort of human eyes viewing an image, a longitudinal light-mixing distance between LEDs is increased, and the spacing between the LEDs is reduced, in a direct-type backlight structure to thereby improve the uniformity of emitted light in the direct-type backlight structure. The longitudinal light-mixing distance between adjacent LED light sources in the direct-type backlight structure in the related art ranges from 2 mm to 22 mm. And since there is a very small horizontal spacing between the LEDs, there are a huge number of LEDs, e.g., ten thousands of LEDs, in the direct-type backlight structure.

Stated otherwise, if the longitudinal light-mixing distance between the LEDs is increased, and the spacing between the LEDs is reduced to thereby improve the uniformity of emitted light in the direct-type backlight structure, then the overall thickness of the direct-type backlight structure will be greatly increased, and the number of LEDs in the direct-type backlight structure will also be increased, thus increasing the cost thereof, and resulting in some redundant number of LEDs.

Embodiments of the disclosure provide an area light source and a display device so as to reduce the thickness of the area light source, which is a direct-type backlight structure, and to reduce the number of LEDs in the area light source, thus lowering the cost thereof.

As illustrated in FIG. 2 to FIG. 7, an area light source according to the embodiments of the disclosure includes following components.

A waveguide layer 1, where the waveguide layer 1 includes a first surface 11 and a second surface 12 opposite thereto, and the second surface 12 of the waveguide layer 1 includes a light extraction component 2 configured to guide light rays propagated in a total reflection mode in the waveguide layer 1 to an outside uniformly.

A plurality of light sources 3, where each of the plurality of light sources 3 is located on a side of the first surface 11.

And a plurality of two-dimensional diffraction grating components 4, where the plurality of two-dimensional diffraction grating components 4 correspond to the plurality of light sources 3 in a one-to-one manner, each of the plurality of two-dimensional diffraction grating components 4 is located between a corresponding light source 3 and the light extraction component 2, and each of the plurality of two-dimensional diffraction grating components 4 comes into contact with the waveguide layer 1, and is configured to guide light rays emitted from the corresponding light source 3 into the waveguide layer 1.

Particularly, in the area light source above according to the embodiments of the disclosure, the light is transmitted in the waveguide layer 1 in a total reflection mode so that the energies and directions of the light rays emitted from the light extraction component 2 are distributed uniformly, so there will be no light-mixing distance in the area light source, and unlike a point light source, it will be easy to control the uniformity of the area light source. In this way, the exiting light can be made uniform without increasing the longitudinal light-mixing distance between the light sources 3, to thereby reduce the overall thickness of the area light source, and lower the production cost thereof. Furthermore, the uniformity of the light rays exiting from the area light source is controlled by the light extraction component 2 so that a single light source 3 can provide an overall backlight of a block, so that the number of light sources 3 in the area light source can be greatly reduced to thereby lower the cost thereof.

Figure 2:
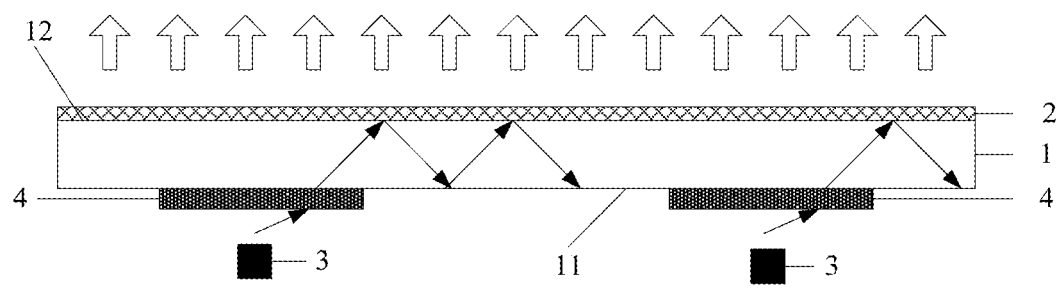
FIG. 2 to FIG. 7 are respective schematic structural diagrams of an area light source according to some embodiments of the disclosure.
Figure 3:
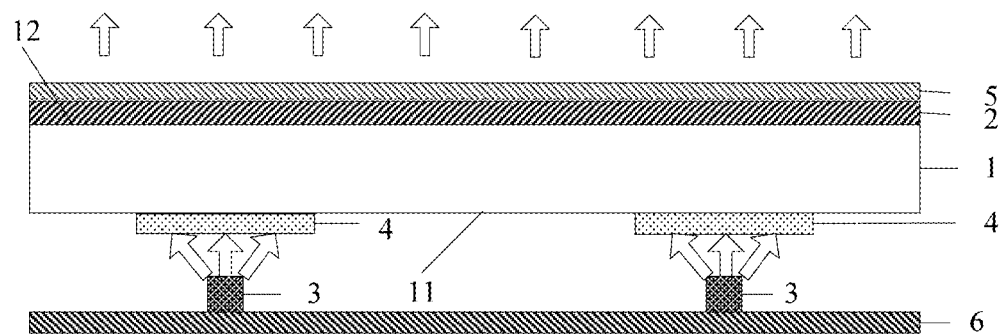

Optionally, in the area light source above according to the embodiments of the disclosure, as illustrated in FIG. 2 and FIG. 3, the two-dimensional diffraction grating components 4 are located on the first surface 11 of the waveguide layer 1, that is, the two-dimensional diffraction grating components 4 come into contact with the first surface 11, and at this time, there will be a preset distance between each light source 3 and the first surface 11.

Optionally, in the area light source above according to the embodiments of the disclosure, as illustrated in FIG. 4 to FIG. 7, the two-dimensional diffraction grating components 4 can alternatively be located on the second surface 12 of the waveguide layer 1, that is, the two-dimensional diffraction grating components 4 come into contact with the second surface 12, and at this time, an orthographic projection of the light extraction component 2 onto the waveguide layer 1 generally does not overlap with orthographic projections of the two-dimensional diffraction grating components 4 onto the waveguide layer 1. Stated otherwise, when both the light extraction component 2 and the two-dimensional diffraction grating components 4 are located on the second surface 12 of the waveguide layer 1, the light extraction component 2 may not be arranged at the positions where the two-dimensional diffraction grating components 4 are located.

Figure 5:
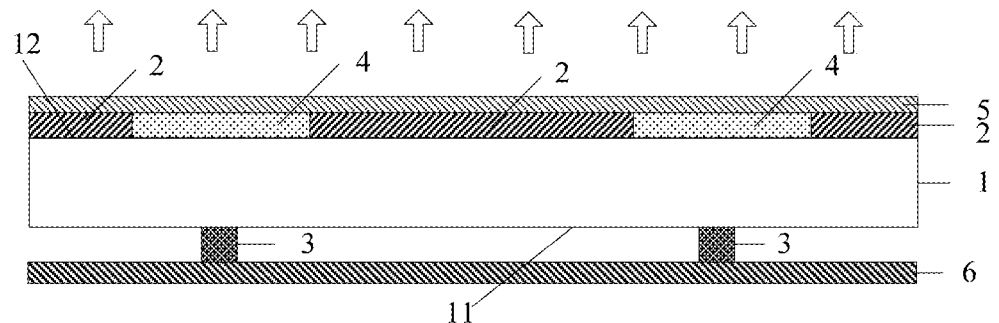
Figure 7:
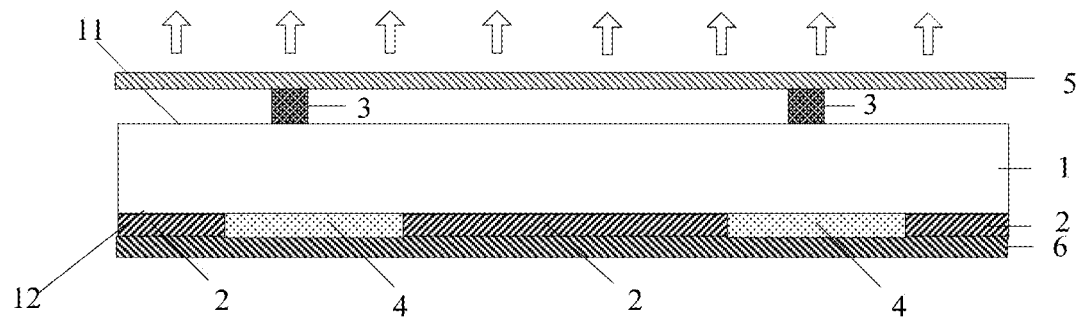

Optionally, in the area light source above according to the embodiments of the disclosure, when the two-dimensional diffraction grating components 4 come into contact with the second surface 12, the light sources 3 can come into contact with the first surface 11 as illustrated in FIG. 5 and FIG. 7 to thereby further reduce the thickness of the area light source.

Optionally, in the area light source above according to the embodiments of the disclosure, both the two-dimensional diffraction grating components 4 and the waveguide layer 1 can be made of a transparent material, and for example, the material of the two-dimensional diffraction grating components 4 can be silicon nitride ($Si_3N_4$), and the material of the waveguide layer 1 can be indium tin oxide (ITO), $Si_3N_4$, etc., although the embodiments of the disclosure will not be limited thereto.

Optionally, in the area light source above according to the embodiments of the disclosure, a refractive index of each two-dimensional diffraction grating component 4 is generally larger than a refractive index of the waveguide layer 1, so that the light transmitted through the area light source can be coupled efficiently to thereby improve the utilization ratio of the light sources 3 so as to save energy.

It shall be noted that, in the area light source above according to the embodiments of the disclosure, the refractive index of the waveguide layer 1 shall be larger than a refractive index of the other medium in contact with the waveguide layer 1 than the two-dimensional diffraction grating components 4 and the light extraction component 2, so that the light is transmitted in the waveguide layer 1 through total reflection. As illustrated in FIG. 2, for example, the medium in contact with the waveguide layer 1 is the air, that is, the refractive index of the waveguide layer 1 shall be larger than a refractive index of the air.

Optionally, in the area light source above according to the embodiments of the disclosure, the light extraction component 2 can include a plurality of netted dot components, and/or, a plurality of grating components. Particularly, the light extraction component 2 can be a separate structure, or can be fabricated directly on the waveguide layer 1, and for example, the plurality of netted dot components can be fabricated directly on the second surface 12 of the waveguide layer 1, and the plurality of grating components can be separate from the waveguide layer 1, although the embodiments of the disclosure will not be limited thereto.

It shall be noted that, in the area light source above according to the embodiments of the disclosure, an intensity of light reaching the light extraction component 2 varies with a varying distance between each light source 3 and the light extraction component 2, so sizes of the plurality of netted dot components, and their arrangement density shall be designed according to the intensity of the light reaching the light extraction component 2, or periodicities, duty ratios, and heights of the plurality of grating components shall be designed according to the intensity of the light reaching the light extraction component 2.

Optionally, in the area light source above according to the embodiments of the disclosure, a typical size of a netted dot component (a length or a width of the netted dot component) ranges from 0.1 mm to 1 mm. Particularly, there may be different diffraction efficiencies of the two-dimensional diffraction grating components 4 at different positions on the surface of the waveguide layer 1 so that a diffraction efficiency of a two-dimensional diffraction grating component 4 positioned proximate to the light sources 3 is lower than a diffraction efficiency of a two-dimensional diffraction grating component 4 positioned away from the light sources 3, to thereby make the energies of the light rays emitted from the light extraction component 2 distributed uniformly.

Optionally, in the area light source above according to the embodiments of the disclosure, as illustrated in FIG. 2 to FIG. 7, an orthographic projection of each light source 3 onto the waveguide layer 1 is generally located at a center of an orthographic projection of a corresponding two-dimensional diffraction grating component 4 onto the waveguide layer 1.

Figure 8:
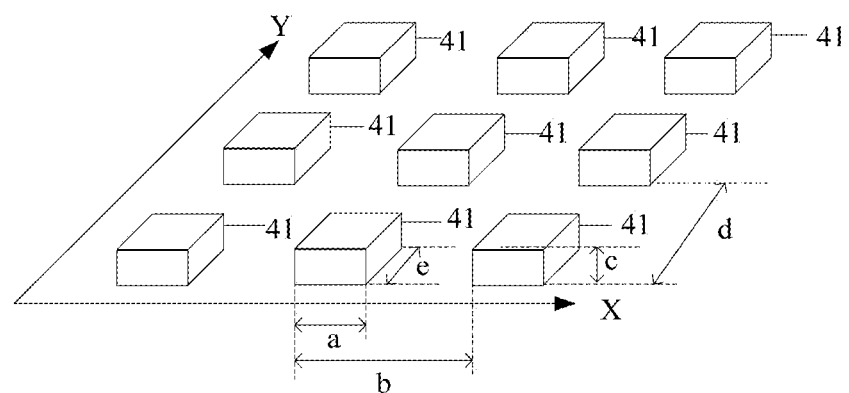
FIG. 8 is a schematic structural diagram of a two-dimensional diffraction grating component in an area light source according to some embodiments of the disclosure.

Optionally, in the area light source above according to the embodiments of the disclosure, each two-dimensional diffraction grating component 4 has a structure as illustrated in FIG. 8, for example, where each two-dimensional diffraction grating component 4 includes a plurality of sub-components 41, and the two-dimensional diffraction grating component 4 has a periodicity in both the X direction and the Y direction of a rectangular coordinate plane where it lies, that is, the sub-components 41 are arranged periodically in both the X direction and the Y direction. In FIG. 8, lengths a and e correspond respectively to line widths of the two-dimensional diffraction grating component 4 in the X direction and the Y direction, a length c corresponds to a height of the two-dimensional diffraction grating component 4 (when respective sub-components 41 are arranged as steps, there will be a plurality of height parameters of the two-dimensional diffraction grating component 4), lengths b and d correspond respectively to periodicities of the two-dimensional diffraction grating component 4 in the X direction and the Y direction. The lengths a and e may or may not be equal to each other, and the lengths b and d may or may not be equal to each other, that is, the line widths and the periodicities of the two-dimensional diffraction grating component 4 in the X direction and the Y direction may or may not be equal to each other.

Furthermore, there is a gap between every two adjacent sub-components 41, or of course, each two-dimensional diffraction grating component 4 may alternatively be arranged as a structure in which there is no gap between every two adjacent sub-components 41, that is, the line widths of the two-dimensional diffraction grating component 4 in the X direction and the Y direction are equal to the periodicities of the two-dimensional diffraction grating component 4 in the X direction and the Y direction respectively. It shall be noted that, in the two-dimensional diffraction grating component 4 as illustrated in FIG. 8, the sub-components 41 are arranged periodically in the X direction and the Y direction, that is, one sub-component 41 corresponds to a periodicity of the two-dimensional diffraction grating component 4, or of course, in the two-dimensional diffraction grating component 4, a component in another shape may correspond to a periodicity of the two-dimensional diffraction grating component 4 alternatively, although the embodiments of the disclosure will not be limited thereto.

Figure 9:
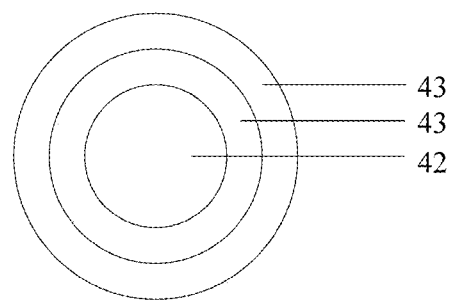
FIG. 9 is a schematic structural diagram of a two-dimensional diffraction grating component according to some embodiments of the disclosure in a top view.

Optionally, in the area light source above according to the embodiments of the disclosure, as illustrated in FIG. 9, each two-dimensional diffraction grating component 4 can include a first sub-grating 42, and a plurality of second sub-gratings 43 surrounding the first sub-grating 42. An orthographic projection of the first sub-grating 42 onto the waveguide layer 1 is a circle, and orthographic projections of the plurality of second sub-gratings 43 onto the waveguide layer 1 are rings concentric with the circle and with different radiuses. FIG. 9 illustrates a two-dimensional diffraction grating component 4 including three sub-gratings by way of an example. Of course, each two-dimensional diffraction grating component 4 in the area light source above according to the embodiments of the disclosure can alternatively be shaped otherwise; the first sub-grating and the second sub-gratings can alternatively be shaped otherwise, although the embodiments of the disclosure will not be limited thereto.

Figures 10, 11:
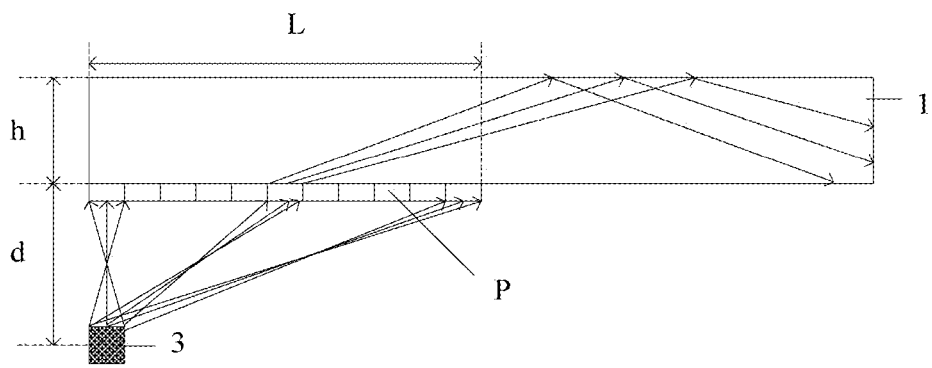
FIG. 10 is a schematic optimized flow chart of a two-dimensional diffraction grating component according to some embodiments of the disclosure.
FIG. 11 is a schematic diagram of a size of a light field of an LED light source according to some embodiments of the disclosure.

It shall be noted that, the structure of each two-dimensional diffraction grating component 4 in the area light source above according to the embodiments of the disclosure can be derived under the rigorous coupled wave theory as a result of optimization using a related algorithm (e.g., a simulated annealing algorithm). As illustrated in FIG. 10, when the light sources 3 are LED light sources, the two-dimensional diffraction grating components 4 efficiently coupling light beams of the LEDs, with a divergence angle ranging from −60° to 60°, into the waveguide layer 1 for transmission through total reflection are optimized particularly in the following operations.

The operation S101 is to determine a size of a light field, on a lower surface of the waveguide layer 1, of a light source 3.

An angle range of light rays of an LED at a specific position of the waveguide layer 1 is quantified from the perspective of an optical field angle (a valid light-emitting range of the light source 3); and as illustrated in FIG. 11, the LED light source 3 is arranged below the waveguide layer 1, and since light emitted from the LED light source 3 is distributed symmetrically, FIG. 11 illustrates a schematic diagram of a right half of a light field of the LED light source 3, and for the light source 3 at a distance d from the waveguide layer 1, the energy thereof is generally concentrated in a range of 0° to 60°, so the size L of the light field of the light source 3 on the lower surface of the waveguide layer 1 can be determined as: L=d/tan (30°).

The operation S102 is to sample and divide the lower surface L of the waveguide layer 1 into several blocks P at a uniform interval so that the light coupling efficiency of the light rays of the light source 3 through each block P satisfies a preset condition.

Each block P in FIG. 11 corresponds to a sub-grating of a corresponding two-dimensional diffraction grating component 4, and since the size of the LED light source 3 is determinate, a range of an angle at which the light beams emitted from the LED light source 3 are transmitted through a sample block P is determinate, that is, the field angle of the LED light source 3 through each block P is determinate.

In the area light source above according to the embodiments of the disclosure, in order to realize a high coupling efficiency, a distribution range of the angle at which the light rays are transmitted through each block P can be limited within 5°, for example, and can be determined according to the size of the LED light source 3 and the distance between the LED light source 3 and the waveguide layer 1. The structure of each sub-grating is optimized so that the light emitted from a light source 3, and reaching and then exiting from a corresponding two-dimensional diffraction grating component 4 is transmitted through the waveguide layer 1 through total reflection, and primary light rays in each sample block are coupled with the highest efficiency while edge light rays in each sample block are coupled as efficiently as possible. In this way, the angle range of light rays of each LED light source 3 is quantified from the perspective of an optical field angle as described above so that the structure of each sub-grating in each two-dimensional diffraction grating component 4 can be optimized.

Particularly, the preset condition satisfied by the light coupling efficiency can be set as needed in reality, and the preset condition for the light coupling efficiency is selected according to the embodiments of the disclosure so that the light coupling efficiency of the light emitted from a light source 3, and reaching and then exiting from a corresponding two-dimensional diffraction grating component 4 is greater than 60%.

According to the idea above of optimizing the two-dimensional diffraction grating components 4, a size of each two-dimensional diffraction grating component 4 on a surface of the waveguide layer 1 corresponds to an entire light field of a corresponding LED light source 3; and optionally, each two-dimensional diffraction grating component 4 satisfies the following condition:

$$D = \frac{2d}{\tan 30°}.$$

Where D is a diameter of the two-dimensional diffraction grating component 4, and d is a distance between a corresponding light source 3, and a surface of the waveguide layer 1 proximate to the two-dimensional diffraction grating component 4.

Optionally, in the area light source above according to the embodiments of the disclosure, a periodicity, a line width, and a height of the first sub-grating 42 are not exactly the same as a periodicity, a line width, and a height of at least one of the second sub-gratings 43; and periodicities, line widths, and heights of at least two of the second sub-gratings 43 are also not exactly the same from each other. Since a grating is sensitive to the angle of incident light, the sub-gratings are provided with different periodicities, line widths, and heights so that each two-dimensional diffraction grating component can couple incident light at a plurality of angles efficiently to thereby further improve the utilization ratio of the light sources 3.

Figure 12:
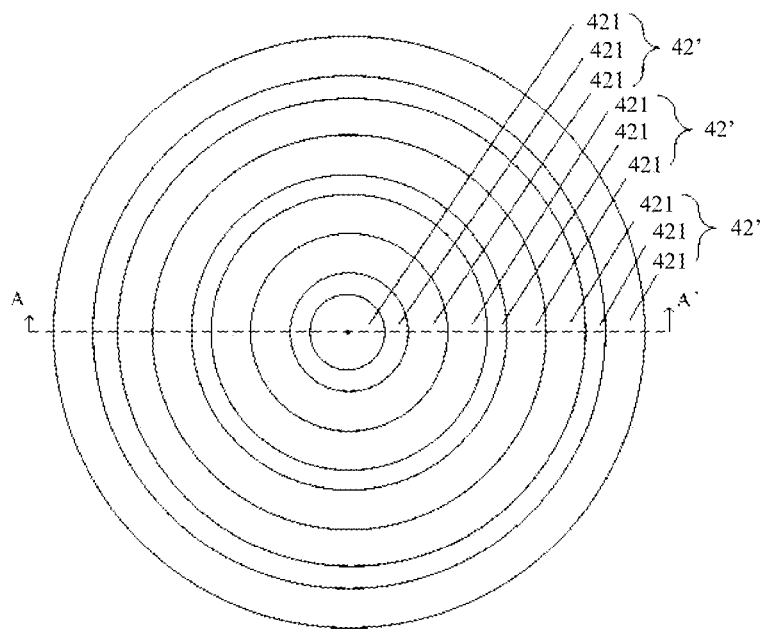
FIG. 12 is a schematic sectional view of a first sub-grating in a direction parallel to a wave guider layer according to some embodiments of the disclosure.
Figure 13:
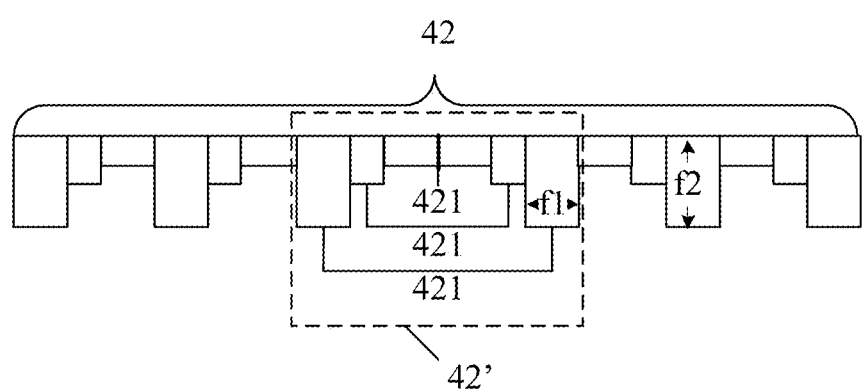
FIG. 13 is a schematic sectional view of FIG. 12 along a line AA'.

Optionally, in the light field modulation layer according to the embodiments of the disclosure, the first sub-grating 42 can include a plurality of first sub-components 421 in any one periodicity of the first sub-grating 42; and particularly in the two-dimensional diffraction grating component as illustrated in FIG. 9, for example, FIG. 12 illustrates a sectional view of the first sub-grating 42 in a direction parallel to the waveguide layer 1, and FIG. 13 illustrates a sectional view of the first sub-grating 42 along a line AA' in FIG. 12, where there are three annular first sub-components 421 in each periodicity 42' of the first sub-grating 42 (the first sub-component 421 corresponding to a center of the first sub-grating 42 can be regarded as a ring with a radius of an inner ring being 0).

Line widths of respective first sub-components 421 may be unequal to each other, and heights thereof may also be unequal to each other; and FIG. 12 and FIG. 13 illustrate unequal line widths f1 and unequal heights f2 of three first sub-components 421 in any one periodicity of the first sub-grating 42.

Figure 14:
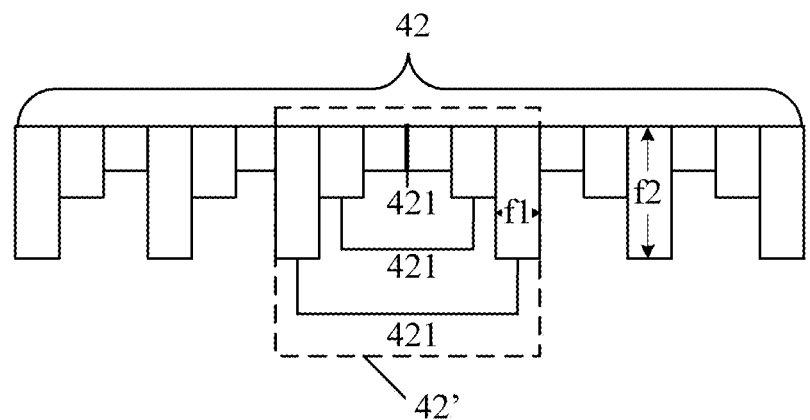
FIG. 14 is a schematic sectional view of a first sub-grating along a diameter thereof according to some embodiments of the disclosure.

Alternatively, the line widths of the respective first sub-components 421 may be equal to each other, and the heights thereof may be unequal to each other, i.e. a sectional view of the first sub-grating 42 along a diameter thereof may be illustrated as FIG. 14, where there are equal line widths f1 but unequal heights f2 of three first sub-components 421 in any one periodicity 42'.

Figure 15:
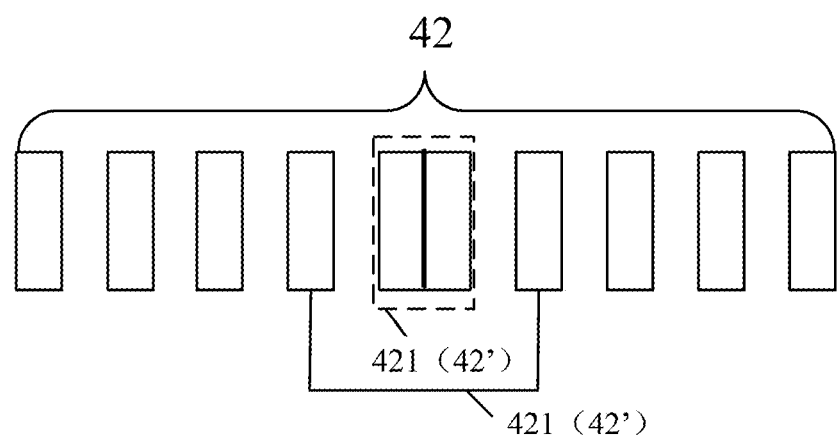
FIG. 15 is a schematic sectional view of a first sub-grating along a diameter thereof according to some embodiments of the disclosure.

Alternatively, the line widths of the respective first sub-components 421 may be unequal to each other, and the heights thereof may be equal to each other. Further, FIG. 15 illustrates a sectional view of the first sub-grating 42 along a diameter thereof, where there are equal line widths f1 and equal heights f2 of annular first sub-components 421 in each periodicity 42'. As can be apparent, when there are equal line widths f1 and equal heights f2 of the first sub-components 421, there will be a gap between adjacent first sub-components 421.

Alike, optionally in the light field modulation layer according to the embodiments of the disclosure, each second sub-grating 43 can include a plurality of second sub-components 431 in any one periodicity of the second sub-grating 43; where, line widths of respective sub-components 431 may be unequal to each other, and heights thereof may also be unequal to each other; or the line widths of the respective sub-components 431 may be equal to each other, and the heights thereof may be unequal to each other; or the line widths of the respective sub-components 431 may be unequal to each other, and the heights thereof may be equal to each other.

Figure 16:
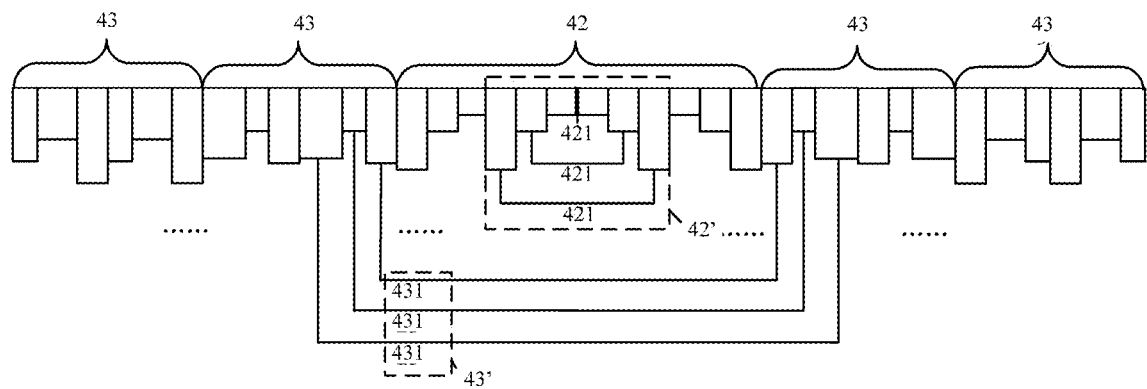
FIG. 16 is a schematic sectional view of a two-dimensional diffraction grating component as illustrated in FIG. 9 in a radius direction.

Particularly, when a two-dimension grating, including different sub-gratings with different periodicities, different line widths, and different heights, with an orthographic projection thereof onto the waveguide layer 1 as illustrated in FIG. 9 has a sectional view in a direction of a diameter thereof as illustrated in FIG. 16, there are at least two periodicities of both the first sub-grating 42 and the two second sub-gratings 43, and each of the first sub-grating 42 and the second sub-gratings 43 includes three first sub-components 421 or three second sub-components 431 with different line widths f1 and different heights f2 in a periodicity 42' or 43'.

Figure 17:
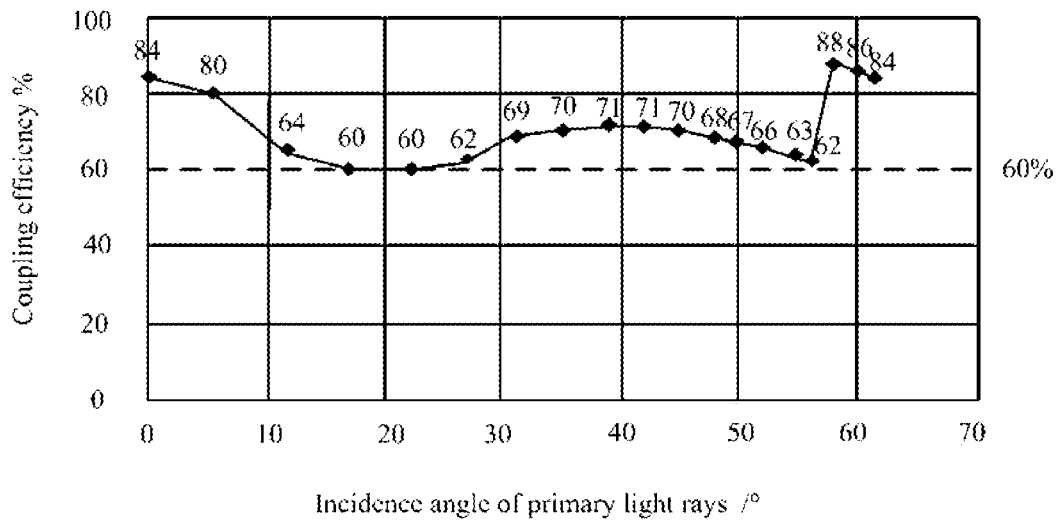
FIG. 17 is a curve graph of an angle of primary light rays and light coupling efficiency according to some embodiments of the disclosure.
Figure 18:
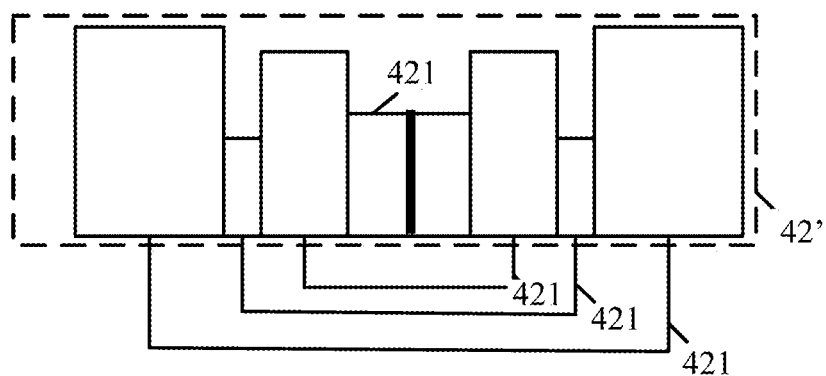
FIG. 18 is a schematic sectional view of a two-dimensional diffraction grating component in a diameter direction in a periodicity of any one sub-grating according to some embodiments of the disclosure.

As designed above, each two-dimensional diffraction grating component 4 is optimized in a global manner via a coupled wave algorithm based upon the simulated annealing algorithm using the following parameters: the size of the LED light source 3 is 0.2 mm, d=2 mm, the refractive index of the waveguide layer 1 is 1.5, the refractive index of the two-dimensional diffraction grating component 4 is 2, an L (3.5 mm) is quantified at a uniform interval, and the number of blocks is 19; where FIG. 17 illustrates a curve graph of a light coupling efficiency corresponding to an angle of primary light rays through each sub-grating (i.e., the angle at which the primary light rays are incident on each block P) as a result of optimization. As can be apparent from FIG. 17, for each sub-grating, the light coupling efficiency of the primary light rays is higher than 60%, Table 1 depicts structural parameters of the respective sub-gratings, and FIG. 18 illustrates a sectional view of the two-dimensional diffraction grating component 4 in a diameter direction thereof in a periodicity of any one sub-grating as a result of optimization, where there are four first sub-components 421 (or four second sub-components 431) with different line widths f1 and different heights f2.

Correspondingly, FIG. 19 illustrates a part of optimization results of light coupling efficiencies of the respective sub-gratings of the two-dimensional diffraction grating component 4, where an angle I represents an angle at which light rays are incident on a sub-grating, T represents a transmittance of the sub-grating, R represents a reflection efficiency of the sub-grating, and numerals following T and R represent diffraction orders. A region in FIG. 19 circled with a bold box in black represents a diffraction angle satisfying the total reflection condition; and as can be apparent from the column Efficiency, the optimized two-dimensional diffraction grating component 4 can diffract and deflect most of the light at a total reflection angle to be coupled in the waveguide layer 1, that is, a total reflection transmission occurs.

It shall be noted that, while the two-dimensional diffraction grating component 4 is being optimized, the size L of the light field may alternatively be divided into several blocks P with different sizes so that there are also different widths of respective sub-gratings in a radius direction of the two-dimensional diffraction grating component 4. The two-dimensional diffraction grating component 4 can be optimized as long as the light entering the waveguide layer 1 through the two-dimensional diffraction grating component 4 is transmitted in the waveguide layer 1 through total reflection, and coupled efficiently. Alternatively, there may be sub-components with equal line widths but unequal heights, or equal heights but unequal line widths, in a periodicity of each sub-grating.

Table 1 is as follows.

| The number of a block P | Periodicity (μm) | The smallest line width (nm) | Incidence angle of primary light rays (°) |
| --- | --- | --- | --- |
| 1 | 1 | 180 | 0 |
| 2 | 0.9 | 183 | 2.7 |
| 3 | 0.95 | 145 | 11.3 |
| 4 | 1 | 56 | 17 |
| 5 | 1 | 184 | 22 |
| 6 | 1.05 | 91 | 27 |
| 7 | 1.1 | 94 | 31 |
| 8 | 1.1 | 64 | 35 |
| 9 | 1.1 | 73 | 39 |
| 10 | 1.1 | 73 | 42 |
| 11 | 1.1 | 80 | 45 |
| 12 | 1.1 | 80 | 48 |
| 13 | 1.1 | 80 | 50 |
| 14 | 1.1 | 80 | 52 |
| 15 | 1.1 | 80 | 55 |
| 16 | 1.1 | 80 | 56 |
| 17 | 1.1 | 105 | 58 |

| The number of a block P | Periodicity (μm) | The smallest line width (nm) | Incidence angle of primary light rays (°) |
|---|---|---|---|
| 18 | 1.1 | 105 | 60 |
| 19 | 1.1 | 105 | 61 |

In order to enable the light emitted from an LED light source to enter the waveguide layer 1 through a two-dimensional diffraction grating component 4, and to be transmitted through total reflection without being hindered by the two-dimensional diffraction grating component 4, optionally, in the area light source above according to the embodiments of the disclosure, the waveguide layer 1 can satisfy the condition of $$\frac{4h}{\tan\theta} > D,$$

where h is a thickness of the waveguide layer 1, and θ is an incidence angle of the light emitted from a light source 3, reaching a corresponding two-dimensional diffraction grating component 4 and then incident on the waveguide layer 1. It shall be noted that, if the light entering the waveguide layer 1 is diffracted at an interface between the waveguide layer 1 and the two-dimensional diffraction grating component 4, then the light will be hindered from being totally reflected, so the thickness of the waveguide layer 1 shall satisfy the condition above so that the light diffracted from a center of the two-dimensional diffraction grating component 4, and entering the waveguide layer 1 will not be hindered from being transmitted through total reflection, due to diffractive modulation thereof by the two-dimensional diffraction grating component 4.

Optionally, in the area light source above according to the embodiments of the disclosure, the thickness of the waveguide layer 1 can be two micrometers, for example, but of course, the thickness of the waveguide layer 1 can alternatively be increased to tens of micrometers, although the embodiments of the disclosure will not be limited thereto.

Optionally, in the area light source above according to the embodiments of the disclosure, the light sources 3 can be LEDs, where chips of the LEDs can be made of an inorganic semiconductor material or an organic light-emitting material, for example, although the embodiments of the disclosure will not be limited thereto.

Optionally, in the area light source above according to the embodiments of the disclosure, the light sources 3 can be monochromatic light sources. For example, the light sources can be blue-light emitting LEDs, or can be LEDs operating in a light wave band beyond the ultraviolet range, or can be monochromatic light sources emitting light in other colors, although the embodiments of the disclosure will not be limited thereto.

Optionally, in the area light source above according to the embodiments of the disclosure, as illustrated in FIG. 3 to FIG. 7, the area light source can further include a monochromatic light converting layer 5 located on a light-emitting side of the area light source; and the monochromatic light conversion layer 5 is configured to convert the light emitted from the light sources 3 into white light.

Optionally, in the area light source above according to the embodiments of the disclosure, the monochromatic light converting layer 5 includes one or more of a fluorescent layer or a quantum dot layer.

Particularly, for example, the fluorescent layer can be made of cerium-doped yttrium aluminum garnet $Y_3Al_5O_{12}$: $Ce^{3+}$, and the quantum dot layer can be made of a quantum dot material, where a quantum dot includes a limited number of atoms, and all of the sizes of the quantum dot in three dimensions are in a nanometer order. Further, a quantum dot is generally a sphere or the like, and typically made of a semiconductor material including elements in the families IIB to VIA or IIIA to VA in the periodic table of elements, or can be made of two or more semiconductor materials; where for example, a semiconductor material including elements in the families IIB to VIA can be CdS, CdSe, CdTe, ZnSe, etc., a semiconductor material including elements in the families IIIA to VA can be InP, InAs, etc.; and the quantum dot is a nanometer particle with a stable diameter ranging from 2 nm to 20 nm.

Optionally, in the area light source above according to the embodiments of the disclosure, as illustrated in FIG. 3 to FIG. 7, the area light source can further include a reflection layer 6 located on a side of the waveguide layer 1 away from the monochromatic light converting layer 5.

Particularly, the light rays emitted from the LED light sources 3 are coupled by the two-dimensional diffraction grating components so there is an inevitable reflection and diffraction loss, so the reflection layer 6 can be arranged to enable the light rays lost due to the reflection and diffraction to be reused. Optionally, the reflection layer 6 can be a metal layer made of a metal material, which can be aluminum or silver, for example, or the reflection layer can be a plurality of medium layers, or made of another material with a function of reflecting light.

Particularly, in the area light source above according to the embodiments of the disclosure, as illustrated in FIG. 3, the LED light sources 3 can be arranged on the reflection layer 6, and located between the waveguide layer 1 and the reflection layer 6; the two-dimensional diffraction grating components 4 can be arranged on the first surface 11 of the waveguide layer 1 proximate to the LED light sources 3, a netted dot component operating as the light extraction component 2 can be arranged on the second surface 12 of the waveguide layer 1 away from the LED light sources 3, and a fluorescent layer operating as the monochromatic light converting layer 5 can be located above the light extraction component 2.

Figure 4:
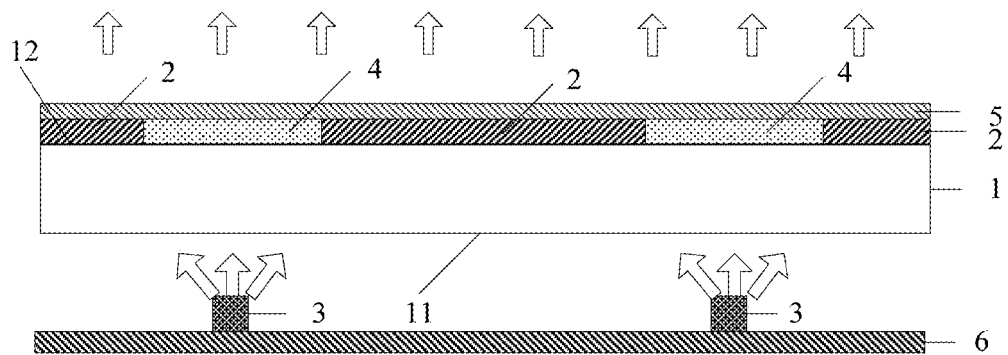

Particularly, in the area light source above according to the embodiments of the disclosure, as illustrated in FIG. 4, both the two-dimensional diffraction grating components 4 and the light extraction component 2 can be arranged on the second surface 12 of the waveguide layer 1 away from the LED light sources 3, and at this time, the distances between the LED light sources 3 and the waveguide layer 1 are approximately zero, the light extraction component 2 is not arranged at the positions where the two-dimensional diffraction grating components 4 are arranged at the waveguide layer 1, and the two-dimensional diffraction grating components 4 are reflective gratings. Further to the area light source as illustrated in FIG. 4, the LED light sources 3 can alternatively come into contact directly with the first surface 11 of the waveguide layer 1 proximate to the LED light sources 3 as illustrated in FIG. 5, that is, the distances between the LED light sources 3 and the waveguide layer 1 are zero, thus further reducing the thickness of the area light source as illustrated in FIG. 5 as compared with the area light source as illustrated in FIG. 4.

Figure 6:
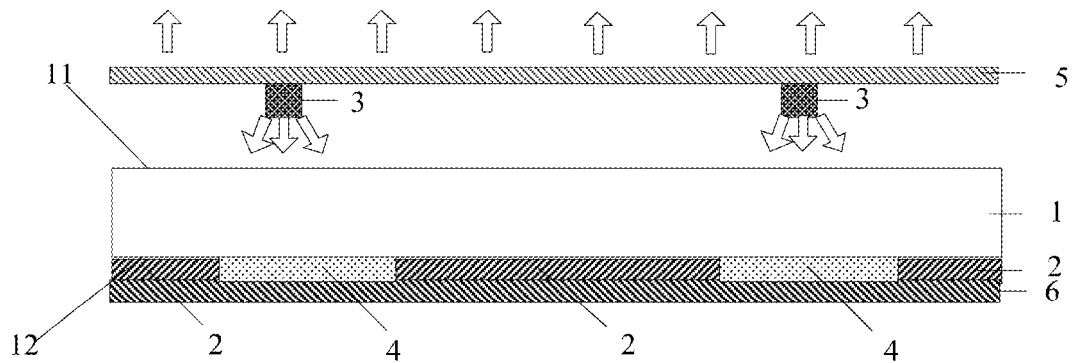

Particularly, in the area light source above according to the embodiments of the disclosure, as illustrated in FIG. 6, alternatively the LED light sources 3 can be arranged below the fluorescent layer 5, and located between the waveguide layer 1 and the fluorescent layer 5, and emit light to the waveguide layer 1; and both the two-dimensional diffraction grating components 4 and the light extraction component 2 can be arranged on the second surface 12 of the waveguide layer 1 away from the LED light sources 3. At this time, the distances between the LED light sources 3 and the waveguide layer 1 are approximately zero, the light extraction component 2 is not arranged at the positions where the two-dimensional diffraction grating components 4 are arranged at the waveguide layer 1, and the two-dimensional diffraction grating components 4 are reflective gratings. Further to the area light source as illustrated in FIG. 6, the LED light sources 3 can alternatively come into contact directly with the first surface 11 of the waveguide layer 1 proximate to the LED light sources 3 as illustrated in FIG. 7, that is, the distances between the LED light sources 3 and the waveguide layer 1 are zero, thus further reducing the thickness of the area light source as illustrated in FIG. 7 as compared with the area light source as illustrated in FIG. 6.

It shall be noted that, in the area light source above according to the embodiments of the disclosure, the distances between the LED light sources 3 and the waveguide layer 1 do not affect the uniformity of light exiting from the area light source, and the distances between the LED light sources 3 and the waveguide layer 1 only affect the light coupling efficiency of the area light source; and in principle, if the distances between the LED light sources 3 and the waveguide layer 1 are larger, then the light coupling efficiency of the area light source will be higher, so the area light source shall be designed by determining the distances between the LED light sources 3 and the waveguide layer 1 according to both the thickness of the area light source, and the light coupling efficiency to be achieved for the area light source. Optionally, in the area light source above according to the embodiments of the disclosure, the distances between the LED light sources 3 and the waveguide layer 1 are greater than or equal to zero.

Based upon the same inventive idea, the embodiments of the disclosure further provide a display device including the area light source above according to the embodiments of the disclosure.

For example, the display device according to the embodiments of the disclosure can be a liquid crystal display device.

Figure 20:
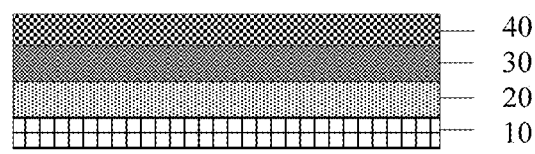
FIG. 20 is a schematic structural diagram of a display device according to some embodiments of the disclosure.

As illustrated in FIG. 20, the display device according to the embodiments of the disclosure includes an area light source 10, a lower polarization layer 20 located above the area light source 10, a display panel 30 located above the lower polarization layer 20, and an upper polarization layer 40 located above the display panel 30, where the area light source 10 can be the area light source according to any one of the embodiments above of the disclosure.

It shall be noted that, while the two-dimensional diffraction grating components 4 are being optimized using the method as illustrated in FIG. 10 according to the embodiments of the disclosure, they can only be optimized for one polarization direction of light rays, that is, only light rays in one polarization direction will be coupled efficiently after being modulated by the two-dimensional diffraction grating components 4. Optionally, in the area light source above according to the embodiments of the disclosure, the two-dimensional diffraction grating components 4 enable the light coupling efficiency of light rays, in any one polarization direction, exiting from the light sources 3 to satisfy the preset condition. The preset condition to be satisfied by the light coupling efficiency can be that the light coupling efficiency is higher than 60%. For example, a two-dimensional diffraction grating component 4 is optimized for a first polarization direction of light rays, thus resulting in a first two-dimensional diffraction grating component 4, and then optimized for a different second polarization direction of light rays than the first polarization direction of light rays, thus resulting in a second two-dimensional diffraction grating component 4, and thereafter the resulting first two-dimensional diffraction grating component 4 and second two-dimensional diffraction grating component 4 are further optimized (for example, by adjusting the heights and the line widths of the gratings at different positions in two dimensional directions) and superimposed onto each other, thus resulting in such a two-dimensional diffraction grating component 4 that both the light coupling efficiencies of the light rays, in the two polarization directions, exiting from a light source 3 are higher, thus further improving the utilization ratio of the light sources in the area light source.

Figure 21:
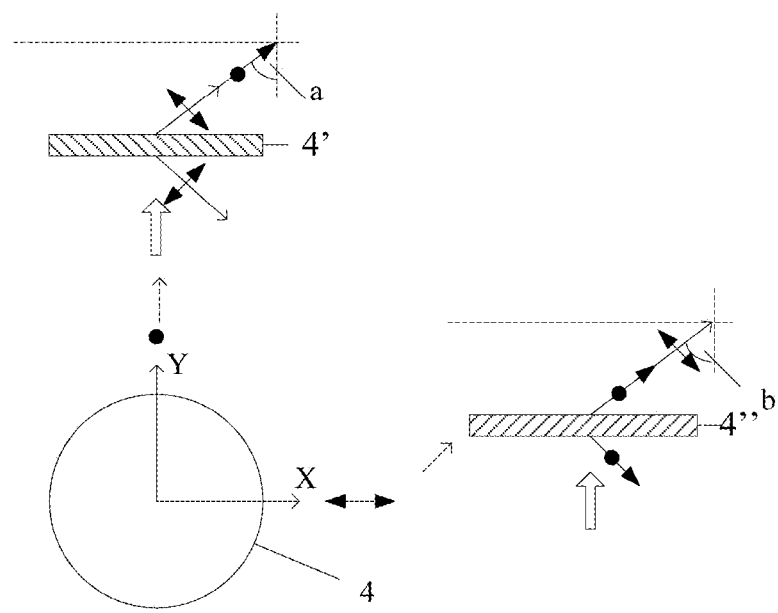
FIG. 21 is a schematic principle diagram of efficient coupling of light rays in two polarization directions by a two-dimensional diffraction grating component according to some embodiments of the disclosure.

For the display device as illustrated in FIG. 20, FIG. 21 illustrates a schematic principle diagram of efficiently coupling the light rays in the two polarization directions by a two-dimensional diffraction grating component 4 in the area light source in the display device, where the resulting first two-dimensional diffraction grating component and second two-dimensional diffraction grating component are further optimized, and superimposed onto each other, thus resulting in the two-dimensional diffraction grating component 4. It shall be noted that, FIG. 21 illustrates a schematic sectional view of the two-dimensional diffraction grating component 4 in a direction parallel to a plane where the waveguide layer 1 lies, where a component of the two-dimensional diffraction grating component 4 corresponding to a section 4' in a direction Y, and a component of the two-dimensional diffraction grating component 4 corresponding to a section 4" in a direction X respectively enable the light coupling efficiencies of the light in the two polarization directions to satisfy the preset condition, where a double sided arrow represents a polarization direction of light parallel to the paper surface, and a solid dot represents a polarization direction of light perpendicular to the paper surface. The component of the two-dimensional diffraction grating component 4 corresponding to the section 4' in the direction Y less reflects and efficiently couples light rays in the same polarization direction as a direction corresponding to the solid dot, and more reflects light rays in the same polarization direction as a direction corresponding to the double sided arrow; and the component of the two-dimensional diffraction grating component 4 corresponding to the section 4" in the direction X less reflects and efficiently couples light rays in the same polarization direction as the direction corresponding to the double sided arrow, and more reflects light rays in the same polarization direction as the direction corresponding to the solid dot. The angles a and b in FIG. 21 are larger than a critical angle of total reflection when the waveguide layer satisfies the total reflection condition, so the light rays in the polarization directions corresponding to the component of the two-dimensional diffraction grating component 4 corresponding to the section 4' in the direction Y, and the component of the two-dimensional diffraction grating component 4 corresponding to the section 4" in the direction X can be transmitted through total reflection after entering the waveguide layer 1.

It shall be noted that, the display device above according to the embodiments of the disclosure can operate with local dimming to thereby reduce power consumption, improve the contrast of a displayed image, increase the number of grayscales, alleviate an afterimage, etc. The area light source of the display device is divided into a plurality of blocks; and while the display device is operating, the contrast of backlight can be adjusted according to the grayscale of a displayed image in a corresponding block, thus saving energy, and improving the quality of the image.

In summary, in the area light source and the display device according to the embodiments of the disclosure, the light is transmitted in the waveguide layer through total reflection, so there will be no light-mixing distance in the area light source, and unlike a point light source, it will be easy to control the uniformity of the area light source. In this way, the exiting light can be made uniform without increasing the longitudinal light-mixing distance between the light sources, to thereby reduce the overall thickness of the area light source, and lower the production cost thereof. Furthermore, the uniformity of the light rays exiting from the area light source is controlled by the light extraction component so that a single light source can provide an overall backlight of a block, so that the number of light sources in the area light source can be greatly reduced to thereby lower the cost thereof.

Evidently those skilled in the art can make various modifications and variations to the invention without departing from the spirit and scope of the disclosure. Thus the invention is also intended to encompass these modifications and variations thereto so long as the modifications and variations come into the scope of the claims appended to the invention and their equivalents.

The invention claimed is:

1. An area light source, comprising:
   a waveguide layer, wherein the waveguide layer comprises a first surface and a second surface opposite thereto, and the second surface of the waveguide layer comprises a light extraction component configured to guide light rays propagated in a total reflection mode in the waveguide layer to an outside uniformly;
   a plurality of light sources, wherein each of the plurality of light sources is located on a side of the first surface; and
   a plurality of two-dimensional diffraction grating components, wherein the plurality of two-dimensional diffraction grating components correspond to the plurality of light sources in a one-to-one manner, and each of the plurality of two-dimensional diffraction grating components comes into contact with the waveguide layer, and is configured to guide light rays emitted from the corresponding light source into the waveguide layer;
   wherein each of the plurality of two-dimensional diffraction grating components comes into contact with the second surface; and an orthographic projection of the light extraction component onto the waveguide layer does not overlap with an orthographic projection of each of the plurality of two-dimensional diffraction grating components onto the waveguide layer;
   wherein each of the plurality of light sources comes into contact with the first surface.

2. The area light source according to claim 1, wherein an orthographic projection of each of the plurality of light sources onto the waveguide layer is located at a center of an orthographic projection of a corresponding two-dimensional diffraction grating component onto the waveguide layer.

3. The area light source according to claim 1, wherein each of the plurality of two-dimensional diffraction grating components satisfies a following condition:

$$D = \frac{2d}{\tan 30°};$$

wherein D is a diameter of the two-dimensional diffraction grating component, and d is a distance between a corresponding light source, and a surface of the waveguide layer proximate to the two-dimensional diffraction grating component.

4. The area light source according to claim 1, wherein the waveguide layer satisfies a condition of $$\frac{4h}{\tan \theta} > D,$$

wherein h is a thickness of the waveguide layer, θ is an incidence angle of a light ray incident on the waveguide layer, and D is a diameter of each of the plurality of two-dimensional diffraction grating components.

5. The area light source according to claim 4, wherein the thickness of the waveguide layer is greater than or equal to two micrometers.

6. The area light source according to claim 1, wherein the light extraction component comprises one or more of a plurality of netted dot components, or a plurality of grating components.

7. The area light source according to claim 1, wherein a refractive index of each of the plurality of two-dimensional diffraction grating components is higher than a refractive index of the waveguide layer.

8. The area light source according to claim 1, wherein each of the plurality of two-dimensional diffraction grating components includes a first sub-grating, and a plurality of second sub-gratings surrounding the first sub-grating; an orthographic projection of the first sub-grating onto the waveguide layer is a circle, and orthographic projections of the plurality of second sub-gratings onto the waveguide layer are rings concentric with the circle and with different radiuses.

9. The area light source according to claim 8, wherein a periodicity, a line width, and a height of the first sub-grating are not exactly same as a periodicity, a line width, and a height of at least one of the plurality of second sub-gratings, and periodicities, line widths, and heights of at least two of the plurality of second sub-gratings are not exactly same from each other.

10. The area light source according to claim 9, wherein the first sub-grating comprises a plurality of first sub-components in any one periodicity of the first sub-grating; and
    both line widths and heights of respective first sub-components are not equal; or line widths of respective first sub-components are equal, but heights of the respective first sub-components are not equal; or line widths of respective first sub-components are not equal, but heights of the respective first sub-components are equal.

11. The area light source according to claim 9, wherein each of the plurality of second sub-gratings comprises a plurality of second sub-components in any one periodicity of the second sub-grating; and
    both line widths and heights of respective second sub-components are not equal; or line widths of respective second sub-components are equal, but heights of the respective second sub-components are not equal; or line widths of respective second sub-components are not equal, but heights of the respective second sub-components are equal.

12. The area light source according to claim 1, wherein each of the plurality of light sources is a monochromatic light source;
the area light source further comprises a monochromatic light conversion layer located on a light-emitting side of the area light source; and
the monochromatic light conversion layer is configured to convert monochromatic light emitted from each of the plurality of light sources into white light.

13. The area light source according to claim 12, wherein the monochromatic light conversion layer comprises one or more of a fluorescent layer or a quantum dot layer.

14. The area light source according to claim 12, wherein each of the plurality of light sources is arranged below the monochromatic light conversion layer, and located between the waveguide layer and the monochromatic light conversion layer.

15. The area light source according to claim 1, wherein the area light source further comprises a reflection layer located on a side of the waveguide layer away from the monochromatic light conversion layer.

16. The area light source according to claim 15, wherein each of the plurality of light sources is arranged on the reflection layer, and located between the waveguide layer and the reflection layer.

17. A display device, comprising the area light source according to claim 1.

* * * * *